United States Patent
Margaritis

(10) Patent No.: US 6,198,624 B1
(45) Date of Patent: *Mar. 6, 2001

(54) ERGONOMIC LAPTOP DISPLAY POSITIONING SUPPORTS

(76) Inventor: Georgios Margaritis, 69 Chester Cir., Los Altos, CA (US) 94022

( * ) Notice: Subject to any disclaimer, the term of this patent is extended or adjusted under 35 U.S.C. 154(b) by 0 days.

This patent is subject to a terminal disclaimer.

(21) Appl. No.: 09/088,384

(22) Filed: Jun. 1, 1998

(51) Int. Cl.[7] .................................. G06F 1/16; H05K 7/14
(52) U.S. Cl. ................................... 361/681; 248/919
(58) Field of Search ............................. 361/680–683; 248/917–920, 923

(56) References Cited

U.S. PATENT DOCUMENTS 5,175,672 * 12/1992 Conner et al. ..................... 361/680
5,196,993   3/1993  Herron .
5,218,389   6/1993  Harlom .
5,229,920   7/1993  Spaniol .
5,249,103   9/1993  Forsythe .
5,375,076  12/1994  Goodrich .
5,729,429   3/1998  Margaritis .

* cited by examiner

Primary Examiner—Lynn D. Feild

(57) ABSTRACT

An ergonomic laptop computer includes a main computer body with a keyboard unit, and a display unit. The height, distance and angle of the display unit can be adjusted by means of controllably extendable supportive members pivotally attached to the main computer body and attached to the display unit. The overall stability of the laptop computer is ensured by either appropriately selecting its weight or by using members attached posteriorly to the main computer unit that can controllably slide in and out of said main computer unit. In another embodiment, the height, distance and angle of the display unit can be adjusted by means of a free standing controllably extendable support base.

2 Claims, 2 Drawing Sheets

ERGONOMIC LAPTOP DISPLAY POSITIONING SUPPORTS

BACKGROUND OF THE INVENTION

This invention relates to laptop computers, specifically to ergonomically designed laptop computers. Laptop computers were introduced to accommodate the mobile computing needs of people whose work environment is not fixed. Laptop computers (also called portable personal computers) are light and compact so that they can be easily transported from location to location.

Modern ergonomics theory and experience teaches us that improper posture of human bodies during the use of computers can produce many types of injuries. These are classified as repetitive, strain injuries. In an ergonomically arranged computer unit, the keyboard unit should be approximately at elbow level while the arms are parallel to the body, and the top of the display unit should be approximately at eye level, or at most 15 degrees below.

Most prior art laptop computers are not ergonomic. The display is permanently attached to the keyboard unit, and therefore there can be no adjustment of the height of the display over the keyboard. An exception is the ergonomic laptop computer presented in U.S. Pat. No. 5,729,429. In said patent, the height, angle and distance of the display can be adjusted over, with respect to and from the keyboard. However, in said patent, a rear display support is used to provide a stable base for the display. The rear display support adds to the manufacturing cost of the laptop computer and may also increase the thickness of the laptop computer when it is in a stored configuration, thus reducing its portability.

In the present invention, display positioning supports are presented that can be used to adjust the height, angle and distance of the display over, with respect to and from the keyboard, without increasing the size of the laptop when stored or transported

BRIEF SUMMARY OF THE INVENTION

The objective of the present invention is to provide an ergonomic laptop computer without compromising portability. Accordingly the preferred embodiment includes a main computer body with a keyboard unit, and a display unit. The height, distance and angle of the display unit can be adjusted by means of controllably extendable supportive members, pivotally attached to the main computer body and attached to the display unit. The overall stability of the laptop computer is ensured by either appropriately selecting its weight or by using members attached posteriorly to the main computer unit that can controllably slide in and out of said main computer unit. In another embodiment, the height, distance and angle of the display unit can be adjusted by means of a free standing controllably extendable support base.

DETAILED DESCRIPTION OF THE EMBODIMENTS

Figure 1:
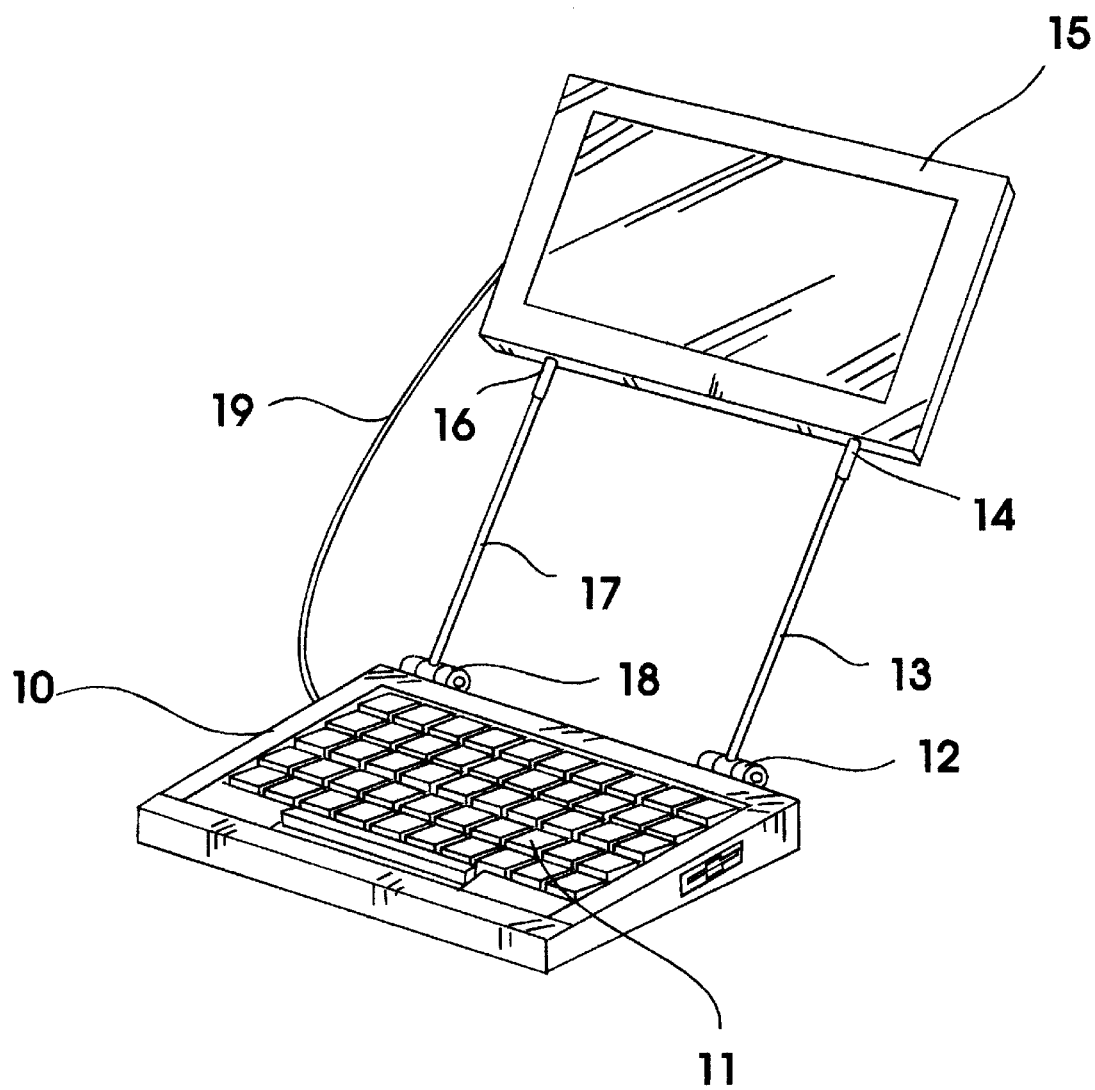
FIG. 1 is a perspective view of one embodiment of the laptop display positioning supports of the present invention, showing controllably extendable supportive members, pivotally attached to the main computer body and attached to the display unit.

FIG. 1 illustrates one embodiment of the present invention. A supportive rod 13 is connected at one end with a hinge 12 to a main computer body 10. The other end of said supportive rod 13 is inserted into a tube 14. Tube 14 is attached to a display unit 15 and extends inside said display unit. The length of tube 14 is approximately equal to the length of rod 13. A second supportive rod 17 is connected at one end with a second hinge 18 to main computer body 10. The other end of said supportive rod 17 is inserted into a tube 16. Tube 16 is attached to display unit 15 and extends inside said display unit. The length of tube 16 is equal to the length of rod 17. A flexible cable 19 is used to electrically connect display unit 15 to main computer body 10 and keyboard unit 11.

Rods 13 and 17 can slide under frictional forces inside tubes 14 and 16 respectively (friction fit). In this first embodiment, the combined frictional force is (and should be) sufficient to support the weight of the display. Also, hinges 12 and 18 allow for the rotation under frictional forces (torques) of rods 13 and 17 respectively. The combined frictional torque is (and should be) sufficient to withstand the torque applied on both hinges by the weight of the display, when the display is at its furthest possible horizontal distance away from the main computer body.

In the embodiment illustrated in FIG. 1 the weight of main computer unit 10 multiplied by the horizontal distance between the center of gravity of said main computer unit 10 and the midpoint between hinges 12 and 18 is greater than the weight of display unit 15 multiplied by the maximum possible horizontal distance between the center of gravity of said display unit 10 and said midpoint between hinges 12 and 18. By choosing so the weight of computer unit 10, we ensure that the laptop will not tip over when display unit 15 is extended away from said computer main body.

Figure 2:
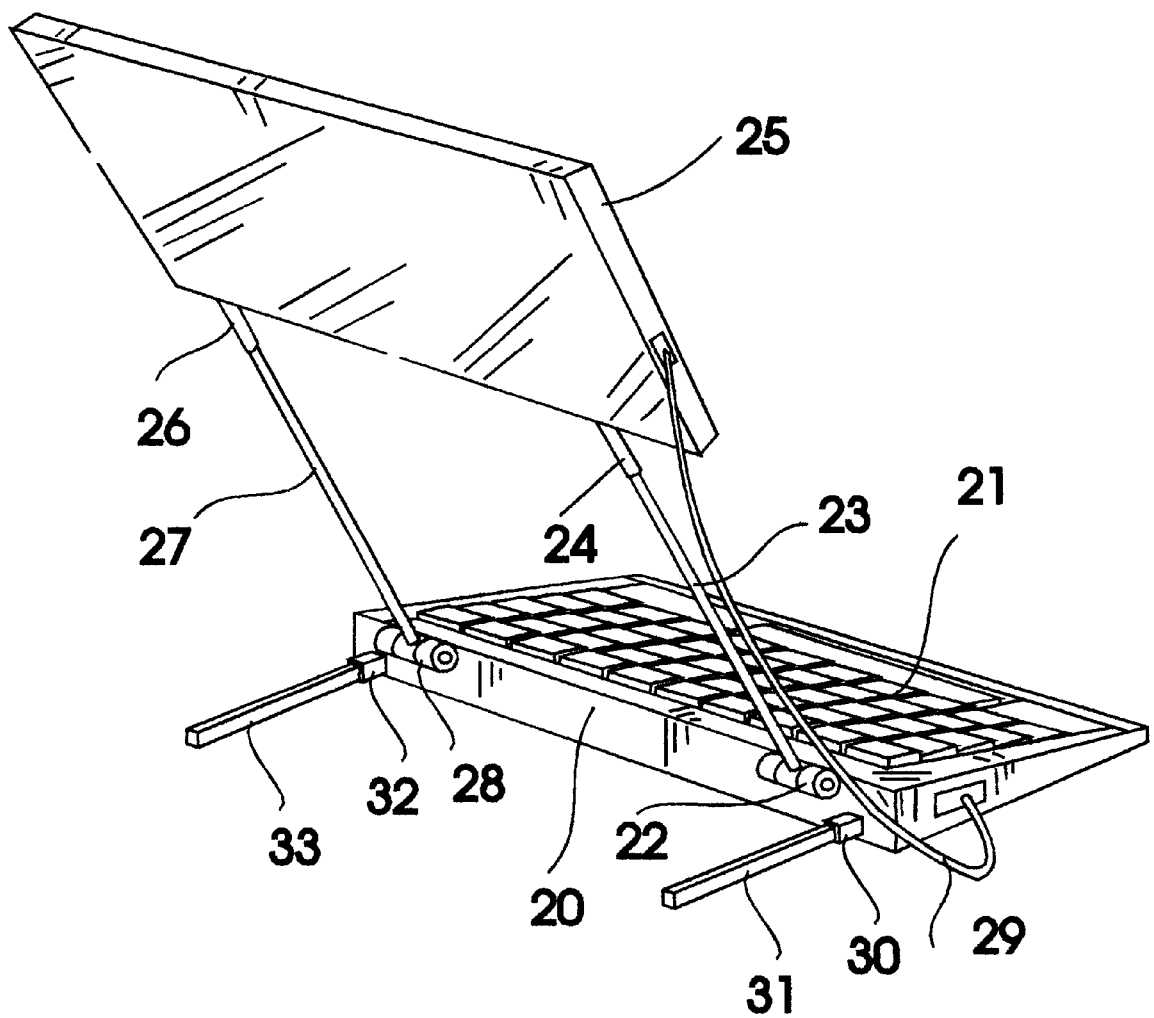
FIG. 2 is a perspective view of a second embodiment of the laptop display positioning supports of the present invention wherein said supports include members attached posteriorly to the main computer unit that can controllably slide in and out of said main computer unit.

FIG. 2 illustrates a second embodiment of the present invention. Supportive rods 23 and 27 are connected at one end with hinges 22 and 28, respectively, to a main computer body 20. The other end of said supportive rods is inserted into tubes 24 and 26. Tubes 24 and 26 are attached to a display unit 25 and extend inside said display unit. A flexible cable 29 is used to electrically connect display unit 25 to main computer body 20 and keyboard unit 21.

Rods 23 and 27 can slide under frictional forces inside tubes 24 and 26 respectively (friction fit). The combined frictional force is (and should be) sufficient to support the weight of the display. Also, hinges 22 and 28 allow for the rotation under frictional forces (torques) of rods 23 and 27 respectively. The combined frictional torque is (and should be) sufficient to withstand the torque applied on both hinges by the weight of the display, when the display is at its furthest possible horizontal distance away from the main computer body.

One end of base rods 31 and 33 is inserted into base tubes 30 and 32. Said base rods can slide inside said base tubes. Base tubes 30 and 32 extend inside main computer body 20. By extending base rods 31 and 33 in and out of base tubes 30 and 32 we can vary the support base of the laptop computer and prevent it from tipping over when display 25 is extended away from main computer body 20. In the embodiment of FIG. 2 no special care needs to be given to the weight of main computer unit 20. In FIG. 2 base rods 31 and 33 and base tubes 30 and 32 are shown having a rectangular cross section, but any other cross section is also acceptable.

Many additional embodiments to the ones described above can also be conceived. For example, well known locking means such as snap locks, or thumbscrews can be used instead of friction fit, to lock the rods along any desired position on the tubes. Further, the hinges can also be locked at any given angular position by means of well known hinge locking mechanisms, such as forming one end of the rotating part of a hinge into a screw and locking it in place against the immovable part using a wing nut. Other embodiments may involve replacing one or more of the rod-tube combinations with any other type of variable length mechanical system, such as an accordion-like or extendable hanger-like mechanism. Also, the rod-tube mechanism used to extend the base of the embodiment of FIG. 2 could be replaced by, for example, a fixed length rod attached to the main computer body by a hinge allowing rotation of said rod about a vertical axis. In this manner, during transportation, the rod could be tucked under the computer body, or tucked inside a specially formed recess in the computer body.

I claim:

1. An ergonomic laptop computer comprising:
   (a) a main computer body with a predetermined weight;
   (b) a display;
   (c) display support means that is pivotally attached to said main computer body and that is attached to said display and that can controllably be extended and contracted along a direction substantially parallel to the direction defined by a midpoint of a lower edge of the display and it midpoint of a posterior edge of said main computer body, for supporting said display at an independently adjustable height and angle over and with respect to said main computer body.

2. An ergonomic laptop computer comprising:
   (a) a main computer body;
   (b) a display;
   (c) display support means that is pivotally attached to said main computer body and that is attached to said display and that can controllably be extended and contracted along a direction substantially parallel to the direction defined by a midpoint of a lower edge of the display and a midpoint of a posterior edge of said main computer body, for supporting said display at an independently adjustable height and angle over and with respect to said main computer body; and
   (d) laptop base extension means that is attached to the posterior of said main computer body and that can controllably be extended and contracted in a plane substantially parallel to the plane defined by the bottom surface of said main computer body, for extending the effective support base of said main computer body.

* * * * *